UNITED STATES PATENT OFFICE.

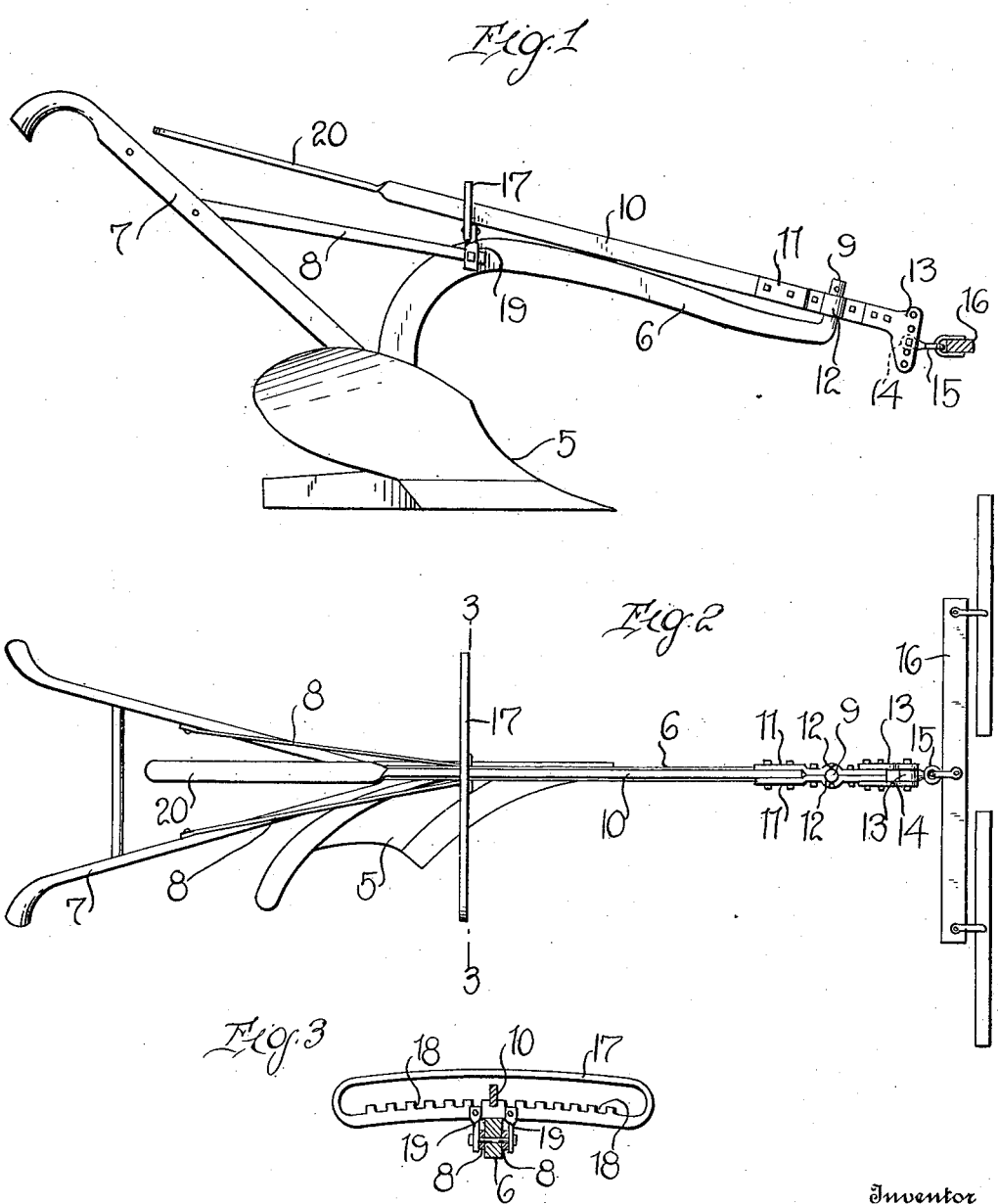

MORTON E. GANGSTAD, OF DEERFIELD, WISCONSIN.

ATTACHMENT FOR AGRICULTURAL IMPLEMENTS.

1,128,438.   Specification of Letters Patent.   Patented Feb. 16, 1915.

Application filed June 22, 1914. Serial No. 846,608.

*To all whom it may concern:*

Be it known that I, MORTON E. GANGSTAD, a citizen of the United States, residing at Deerfield, in the county of Dane and State of Wisconsin, have invented certain new and useful Improvements in Attachments for Agricultural Implements, of which the following is a specification, reference being had to the accompanying drawings.

This invention relates to an improved draft for plows, and has for its primary object to provide simple, durable, and reliable means whereby the longitudinal line of draft may be changed at the will of the operator as circumstances and conditions may require.

In its more specific aspect, the present invention provides an operating lever or bar fulcrumed at its forward end upon the plow beam and equipped with means for the attachment of the double-tree thereto, said lever being adapted to be shifted with respect to the beam to position the double-tree with respect to the plow blade, and means mounted upon the plow beam for retaining the lever in its adjusted position.

The invention has for a still further object to produce an attachment of the above character which may be readily applied to the ordinary plow without necessitating any material alterations in its construction, and is of great convenience and serviceability in practical use.

With the above and other objects in view as will become apparent as the description proceeds, the invention consists in certain constructions, combinations, and arrangement of the parts that I shall hereinafter fully describe and claim.

For a full understanding of the invention, reference is to be had to the following description and accompanying drawing, in which—

Figure 1 is a side elevation of a plow showing my improved attachment applied thereto; Fig. 2 is a top plan view; and Fig. 3 is a section taken on the line 3—3 of Fig. 2.

Referring in detail to the drawing, 5 indicates the blade of the plow, 6 the usual beam upon the rear end of which said plow blade is secured, and 7 the handles whereby the plow is properly guided by the operator. These handles are connected to the beam and braced by the rods 8.

In the application of my invention to the plow, the forward end of the plow beam which is ordinarily provided with a clevis, is fashioned into the upwardly projecting stud 9, which is round or cylindrical in form.

10 designates a lever to one end of which the longitudinally projecting plates 11 are bolted or otherwise secured. These plates beyond the end of the lever are provided with opposed outwardly curved portions to form a bearing sleeve 12 which is adapted for engagement upon the upwardly projecting stud 9 on the end of the plow beam 6. Upon the outer sides of the plates 11 at their forward ends the spaced plates of a clevis indicated at 13 are securely bolted. These clevis plates are of the ordinary construction and between the same the swivel block 14 is adapted to be vertically adjusted. A ring or eye 15 is swiveled upon this block to which the double-tree, indicated at 16 is adapted to be connected.

From the pivot stud 9 on the plow beam, the lever 10 extends rearwardly above said beam and through a transversely elongated loop 17, the lower side of which is provided with rack teeth 18. To the loop short rods or bolts 19 are secured at one of their ends, the other ends of said rods being provided with openings to receive the bolts which connect the forward ends of the brace rods 8 to the plow beam. In this manner, it will be understood, the rack loop is rigidly secured upon the plow beam. The lever 10 is preferably twisted at a point rearwardly of the loop 17 to provide a handle portion 20, whereby said lever may be conveniently manipulated.

The several parts of my attachment being arranged upon the plow beam as above explained, when obstructions in the path of the draft animals is encountered, the operator simply grasps the rear end of the lever 20 and shifts the same in the proper direction to dispose the draft attachments on the forward end of said lever at one side or the other of the line of movement of the plow blade. When it is necessary to use three horses in plowing, the draft connection may be so positioned that the horses may walk between the rows of stubble. As the lever may be very easily and quickly manipulated, rocks and other obstructions may be readily avoided. It will be seen from the above that I have produced a very simply constructed, durable, and highly serviceable attachment for plows which may be inexpensively manufactured and readily applied to plows of the ordinary construction without requiring material alterations therein.

While I have above described the preferred form, construction, and arrangement of the several elements employed, it will be understood that the device is nevertheless, susceptible of considerable modification therein, and I therefore reserve the privilege of resorting to all such legitimate changes as may be fairly embodied within the spirit and scope of the invention as claimed.

What is claimed is:

The combination with an earth disturbing implement having a beam fashioned on its forward end into an upwardly projecting pivot stud, parallel plates provided with bearing portions for engagement upon opposite sides of said stud, said plates being rigidly bolted together and spaced apart at their corresponding ends, a lever extending above the beam and fixed between the spaced ends of said plates, a clevis secured upon the other ends of said plates for connection with a draft attachment, said lever being shiftable with respect to the beam to dispose the draft attachment with respect to the line of movement of the implement, and means mounted upon the beam for retaining the lever in its adjusted position.

In testimony whereof I hereunto affix my signature in the presence of two witnesses.

MORTON E. GANGSTAD.

Witnesses:
 ROY GANGSTAD,
 I. B. BENNETT.

Copies of this patent may be obtained for five cents each, by addressing the "Commissioner of Patents, Washington, D. C."